C. W. RUSSELL.
BRAKE SYSTEM FOR DETACHABLE TRUCK TRAINS.
APPLICATION FILED MAR. 16, 1912.
1,161,978.
Patented Nov. 30, 1915.
2 SHEETS—SHEET 1.
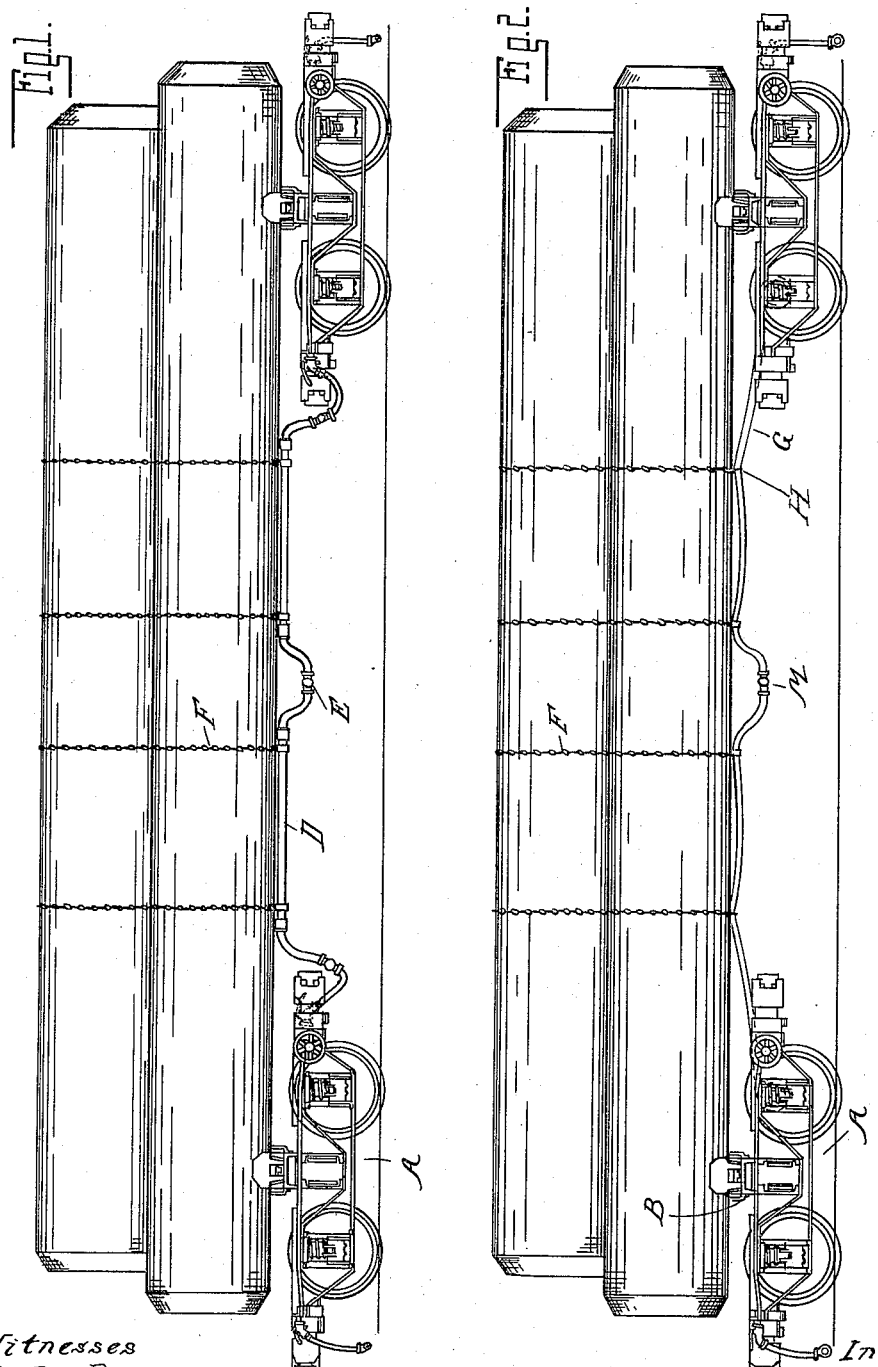

C. W. RUSSELL.
BRAKE SYSTEM FOR DETACHABLE TRUCK TRAINS.
APPLICATION FILED MAR. 16, 1912.
1,161,978.
Patented Nov. 30, 1915.
2 SHEETS—SHEET 2.
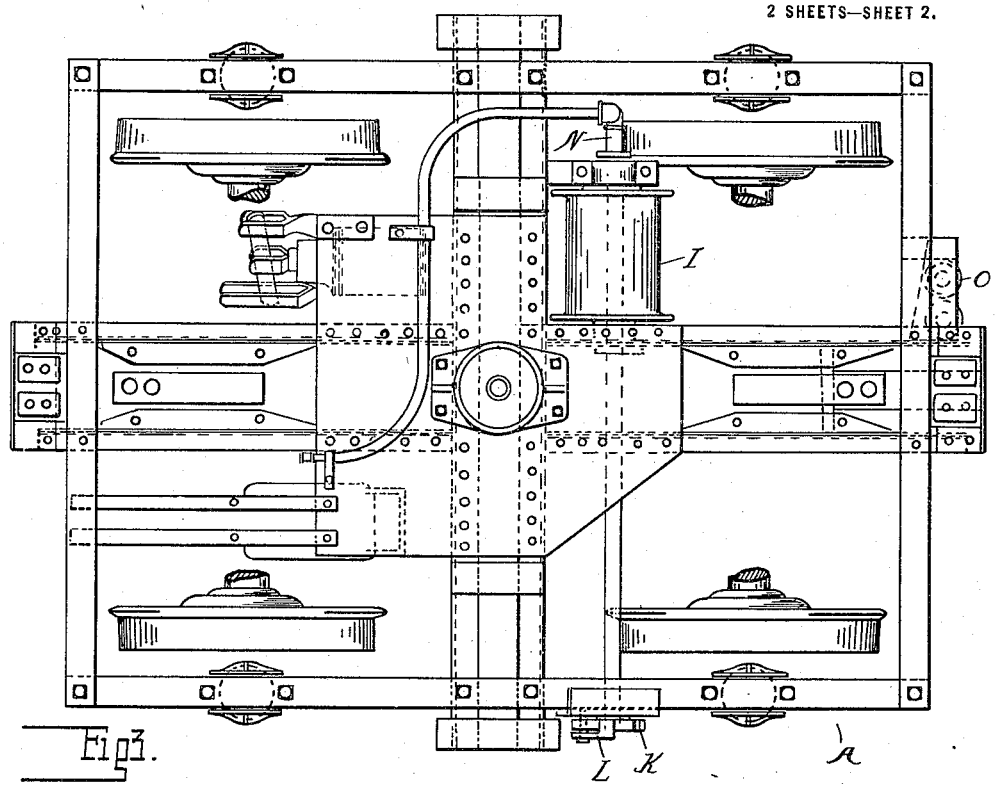
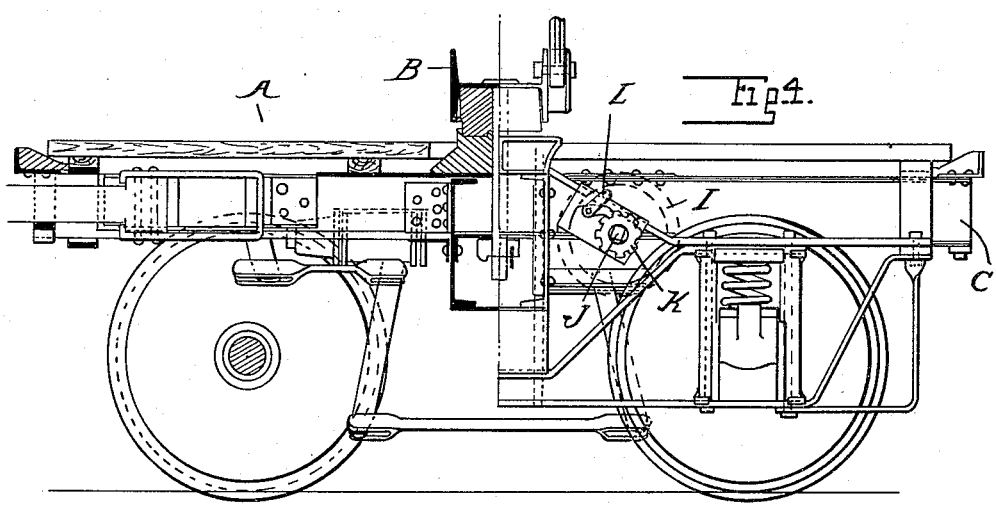
Witnesses
Inventor
Clinton W. Russell

UNITED STATES PATENT OFFICE.

CLINTON W. RUSSELL, OF DETROIT, MICHIGAN.

BRAKE SYSTEM FOR DETACHABLE-TRUCK TRAINS.

1,161,978. Specification of Letters Patent. Patented Nov. 30, 1915.

Application filed March 16, 1912. Serial No. 684,197.

*To all whom it may concern:*

Be it known that I, CLINTON W. RUSSELL, a citizen of the United States of America, residing at Detroit, in the county of Wayne and State of Michigan, have invented certain new and useful Improvements in Brake Systems for Detachable-Truck Trains, of which the following is a specification, reference being had therein to the accompanying drawings.

The invention relates to detachable truck trains more particularly designed for use in logging, the trucks being connected by the logs when loaded, and when empty being directly coupled to each other.

It is the object of the invention to provide an air brake system which is operable both in the loaded and unloaded condition of the train, and to this end the invention consists in the construction as hereinafter set forth.

In the drawings,—Figure 1 is a side elevation of a loaded pair of trucks showing the arrangement of the brake operating mechanism thereon; Fig. 2 is a similar view of a modified construction; Fig. 3 is a plan view of one of the trucks; Fig. 4 is a sectional side elevation thereof.

A is a detachable truck provided with the usual bunk B or other support upon which the logs may be loaded and C are the draft bars for coupling the trucks to each other. My improved pneumatic brake system comprises a suitable brake operating mechanism on each truck (not shown in detail) and which is operated by air conveyed to each truck through a train pipe. Inasmuch however, as the trucks when loaded are in separated pairs, while in the unloaded condition they are coupled directly to each other, it is obvious that the ordinary train pipe used on flat cars cannot be employed.

The essential feature of my invention broadly described is an extensible train pipe which when the trucks are separated may be extended to bridge the space therebetween, while in the unloaded condition it is capable of being shortened to couple the pipe of one truck directly with that of an adjacent truck. One construction which may be used for this purpose is shown in Fig. 1 of the drawings and consists of a series of train pipe sections D detachably connected by the usual hose couplers E and together spanning the space between the separated trucks when loaded. These sections may be held in position by chains or other securing means F which extend around the load of logs to suspend the pipe sections therefrom. When the trucks are empty the sections D may be detached and carried on the trucks back to the point of loading where they are again used for extending the train pipe.

In Fig. 2 a modified construction is shown in which in place of sections of rigid pipe, the air connection is formed by a flexible hose G on each truck of sufficient length to meet the corresponding hose on the coöperating truck in the loaded train. The hose is suspended by chains F similar to those used in the construction shown in Fig. 1, but preferably provided with eyes H through which the hose may be drawn. To contract the hose when the trucks are empty it is preferably reeled upon a drum I which is mounted upon the truck frame and is operated from one side thereof by means of a suitable crank J and locked from movement by suitable means such as the notched wheel K and dog L. The outer end of the hose is provided with the coupling M but the inner end is preferably attached to a fitting upon the collar or drum I and which receives its air through a conduit N axially engaging the drum. The hose is preferably guided by suitable groove wheels or sheaves O on the truck frame over which it runs and which support the flexible end where two trucks are coupled directly to each other.

With each of the modifications which has been described the train pipe may be extended or contracted to correspond to the maximum variation in relative position of adjacent trucks. The brake system may be otherwise the same as the standard constructions in use and the engineer is thus able to control the entire train.

What I claim as my invention is:

The combination with a pair of detachable trucks, each provided with air brake mechanism, of a series of train pipe sections detachably connected for coupling the air brake mechanism of one truck with that of another, and means for supporting said sections from the load upon said trucks.

In testimony whereof I affix my signature in presence of two witnesses.

CLINTON W. RUSSELL.

Witnesses:
E. F. SCHEMANSKY,
CHAS. C. STEGER.

Copies of this patent may be obtained for five cents each, by addressing the "Commissioner of Patents. Washington, D. C."